United States Patent [19]

Maier

[11] 4,225,358
[45] Sep. 30, 1980

[54] ADDITIVE FOR DEHUMIDIFYING PLASTER

[75] Inventor: Siegfried Maier, Westendstr. 2, Buchloe, Fed. Rep. of Germany, 8938

[73] Assignee: Caterpillar Tractor Co., Peoria, Ill.

[21] Appl. No.: 20,200

[22] Filed: Mar. 13, 1979

[30] Foreign Application Priority Data

Apr. 3, 1978 [DE] Fed. Rep. of Germany ....... 2814317

[51] Int. Cl.$^3$ .............................................. C04B 7/35
[52] U.S. Cl. ........................................ 106/90; 106/98; 106/314; 260/29.6 PS; 260/42.13
[58] Field of Search ............................ 106/90, 98, 314; 260/29.6 S, 29.6 PS, 42.13

[56] References Cited

U.S. PATENT DOCUMENTS 4,039,345  8/1977  Emig et al. ............................. 106/90
4,040,855  8/1977  Rady-Pentek et al. ......... 260/29.6 S

*Primary Examiner*—James Poer
*Attorney, Agent, or Firm*—Browdy and Neimark; Charles E. Lanchantin, Jr.

[57] ABSTRACT

A plaster additive, especially for use with cement-based dehumidifying plasters which impart to the plaster the property of low resistance to the diffusion of water therethrough, permitting the application to moist or wet masonry and especially masonry subject to continuous moisture exposure, for example by capillary flow from the foundation. The additive according to the invention imparts to the fungus-resistant cement-based plasters the property of dehumidifying the wall while the surface of the plaster remains dry. The additive according to the invention may be used with normal interior or exterior plasters, adhesive plasters and also with thermally insulating plasters that include a thermally insulating filler, for example, styropor spheres.

15 Claims, No Drawings

ADDITIVE FOR DEHUMIDIFYING PLASTER

BACKGROUND OF THE INVENTION

The invention relates to plasters, i.e., materials which are to be applied to walls of rooms within buildings for practical and/or decorative purposes. The present invention relates more particularly to plasters for use on walls in which there exists a relatively high himidity and is thus especially relevant for use in the reclaiming and renovating of old buildings. The masonry to which the plaster is applied may contain a limited amount of inherent humidity but the masonry may also be subject to a continuous exposure to humidity such as, for example, bath houses, breweries etc. Similarly, the building may contain masonry that is in contact with moisture that is present in or near the foundation, the moisture being caused to rise into the masonry due to capillary forces. The latter condition is very common in old buildings.

If ordinary plaster is applied to such masonry, the outer surface is generally sealed with respect to the internal humidity but the humidity is retained in the wall end continues to act therein. Accordingly, it has been attempted for a long time to discover various plasters which permit the water contained in the masonry to travel to the exterior so that it may evaporate there. A critical property of a plaster which is to perform this function is its coefficient of diffusion resistance, i.e., the resistance which the plaster offers to the diffusion of water from the masonry through the plaster to its surface where it may evaporate into the atmosphere. The plaster must also and at the same time exhibit satisfactory insulation to heat and sound however.

Commonly known lime plasters have a coefficient of diffusion resistance of approximately 15–18 and cement mortar plasters have a coefficient of approximately 22–25. Accordingly, lime plasters would be more suitable in principle to perform the diffusion of moisture because they have a lower inherent resistance to its passage than do cement mortars. However, they have the unfortunate property of releasing the moisture only slowly and thus permitting only slow drying rates. Furthermore, lime plasters are susceptible to the growth of fungus. On the other hand, cement mortars are very resistant to fungus growth but their other properties make them unsuited for dehumidifying functions.

It has been attempted to provide plasters with an increased degree of capillary activity, i.e., plasters with a relatively loose structure which would permit a greater permeability to moisture and such plasters have exhibited coefficients of diffusion resistance of approximately 11 for a normal thickness of approximately 15 mm. However, even this improved diffusion resistance does not suffice to dry out masonry walls, especially if water is continuously resupplied by capillary forces from the foundation of the building.

OBJECT AND SUMMARY OF THE INVENTION

It is a principle object of the present invention to provide a method and a product for dehumidifying masonry walls, especially masonry walls in which moisture is continuously resupplied from the foundation. It is an associated object of the present invention to provide a method and a product for creating a plastered wall surface which is substantially dry but which continues to transmit and evaporate moisture from the interior of the masonry wall.

These objects are attained according to the invention by providing a plaster with an additive which is made from surface active agents and synthetic materials and which imparts to the finished plaster the property to aspirate moisture from the humid masonry and to transport the moisture or moisture vapor relatively rapidly through the layer of plaster and to deliver it at its external surface to the surrounding atmosphere, thereby maintaining the surface of the plaster substantially in a dried condition.

The plaster additive according to the present invention is characterized by the presence of a number of constituents. Among these are (a) 15–50 weight % of anionic sodium salts of alkyl-naphthalene sulfonic acid, (b) 25–75 weight % of sodium salts of alkylphenol ether sulfate and/or alkylbenzene sulfonate, especially sodium salts of sulfated $C_{12}$-$C_{15}$-oxoalcohol polyglycol ether, which are also called $C_{12}$-$C_{15}$ fatty alcohol ether sulfates, and (c) 10–40 weight % of a styrene interpolymer having an acid number of 5–15 such as used for producing aqueous synthetic dispersions, especially butadiene-free styrene interpolymers, for example styrene/acrylic acid interpolymer or styrene/acrylic ester/acrylic acid interpolymer having an acid number of 8–12, all of these constituents being preferably supplied as a fine dry powder. The term "alkyl" preferably denotes $C_1$-$C_6$ alkyl and the term "ether" or "polyglycol" preferably denotes polyoxyethylene ethers.

The composition can be further enhanced by the provision of 7–15 weight % of a size-free highly concentrated paraffin dispersion and 7–15 weight % of sodium salts of a naphathalene sulfonic acid-formaldehyde condensation product. This latter addition is especially suitable for producing water-repellent plasters.

The additive according to the invention is used with cement-based plasters, i.e., plasters made on the basis of sand and cement and it modifies the basically unfavorable properties of cement plasters in a manner which produces substantially better coefficients of diffusion resistance than can be achieved even in known lime plasters.

It should be noted however that the additive according to the invention is useful not only for plasters that are sand and cement based but is also very well usable as an additive for heat insulating plasters in which a certain portion of the sand is replaced, for example, by formed polystyrene granules, or by other common heat insulating materials such as vermiculite or expanded or mixtures of heat insulating materials expanded clay granules.

In order to facilitate the measurement of the additive, it is suitably mixed with an inert material, especially quartz powder. A composition of equal weights of quartz powder and the additive according to the invention has been found to be useful. This admixture increases the total weight by a factor of 2 which permits facilitated dosaging and reduces the importance of any dosaging errors.

The preferred range of constituents of the additive according to the invention is:

30–40 weight % of anionic sodium salts of akylnapthalene sulfonic acid; 40–60 weight % of sodium salts of sulfated $C_{12}$-$C_{15}$-oxoalcohol polyglycol ether; and 10–20 weight % of a styrene interpolymer powder, especially one having a sintering temperature above 100° C., a softening point above 120° C., a pouring weight of 0.3–0.4 kg/l, a density (d 20°/4°) of approximately 1.1 and an acid number of 8–12, the latter being determined by dispersion of the powder in an excess n/10 sodium hydroxide solution followed immediately by reverse titration with n/10 sulphuric acid with the use of phenolphthalein.

When the additional constituent of 7–15 % of a paraffin dispersion and/or sodium salts of naphthalene sulfonic acid-formaldehyde-condensates is used, the quantity of the three main constituents can be reduced by approximately 2–5 % so that the overall quantity of the constituents will be the same.

The additives according to the invention are suitable for use in cement-based plasters in which the normal ratio of sand to cement is approximately 60 liters of sand to 10–30 liters of cement, and especially 15 liters of cement.

If the additives are to be used in cement-based heat-insulating plasters, up to 50 liters of the above-cited 60 liters of sand may be replaced by a granular, heat-insulating material which may be provided as spheres or irregular pieces and this material may, in particular, consist of styropor balls. The preferred amount of the heat-insulating material in the above-cited overall composition would be 10–50 liters of heat-insulating granules for 10 liters of sand, and especially 30–40 liters of heat-insulating material for 20–30 liters of sand associated with 10–30 liters of cement, the preferred amount of cement being approximately 15 liters of cement for interior plasters and approximately 20–25 liters of cement for exterior plasters. The grain size of the heat-insulating material granules is approximately between 1 and 4 mm.

In order to provide improved adhesion of the plaster to moist masonry, it may be suitable to apply a preliminary layer of an adhesive plaster in which the cement component is approximately double, i.e., in which approximately 60 liters of sand are mixed with 30 liters of cement. For every 100 kg of sand/cement mixed in the above ratio, there are then added 50–150 grams of the undiluted plaster additive according to the invention. For normal plasters, the preferred quantity is 50–100 grams of additive and for adhesive plasters it is 75–125 grams for every 100 kg of sand/cement mixture. An especially preferred quantity is approximately 75 grams for normal plasters and approximately 100 grams for adhesive plasters for every 100 kg of the sand/cement mixture. Increasing the portion of cement in the plaster increases its strength but reduces its permeability to water.

The basic method of applying the plaster according to the invention may be any commonly used method, i.e., for example by hand or by machine. However, it is important that the masonry wall be prepared, including the removal of any old plaster still adhering thereto and also any plaster which appears to be still intact. In new buildings, the plaster is to be applied to a bare masonry wall. Any paint or paint remnants must also be totally removed. The plaster must be applied to a vertical height which lies above the visible moisture line by at least one and one-half wall thicknesses. It is also advantageous to scrape mortar out of the masonry joints to a depth of approximately 1–2 cm and to clean the surface of the masonry by means of a wire brush or broom until all loose remnants and mortar dust are completely removed. Any broken or damaged masonry can be repaired with plaster mortar and stones.

Prior to the application of the plaster, the masonry must be washed with water and a brush or must be sprayed with a high-pressure water stream. In any case, the masonry surface must be moist prior to the application of the plaster. Concrete walls should be premoistened several times.

As already mentioned, it is suitable and useful to apply a preliminary adhesive plaster layer with a higher content of cement in a layer of approximately 5 mm and in such a manner as to cover the entire surface. For some applications, the preliminary layer is all that is required. However, in normal plastering, another layer of plaster of the preferred mixture ratio of sand and cement is then applied up to a total thickness of usually 15–25 mm. The plaster has a tendency to dry very rapidly and remains dry even though it continuously transports water from the humid masonry to the outside.

The water transporting function takes place in layers of plaster of a thickness of only 3–5 mm, for example so-called sludge plasters.

A plaster to which the additive according to the invention is added has a tendency to prevent the formation of condensation even in thin layers and has no tendency to be wetted during the drying process because any external moisture, for example due to sprays and high air humidity can enter the plaster from the outside only to a very limited degree and this effect is in all cases overwhelmed by the transport of moisture from the inside to the surface. Due to the high cement content and due to the fact that the outside remains practically dry, the plaster equipped with the additive according to the invention has no tendency to the formation of fungus or moulds and does not bloom. The plaster has higher than usual elasticity and a reduced tendency to crack when compared with normal and heretofore known plasters. The resistance to the transmission of sound and heat is also greater than in commonly known plasters.

DESCRIPTION OF A PREFERRED EXEMPLARY EMBODIMENT OF THE INVENTION

A preferred but non-limiting example of an additive according to the invention has the following constitution:

16 weight % of a sodium salt of diisobutyl napthtalene sulfonic acid;

22 weight % of a sodium salt of sulfated $C_{12}$-$C_{15}$-oxoalcohol polyglycol ether;

6 weight % of finely powdered styrene-acrylic acid interpolymer of styrene-acrylic ester-acrylic acid interpolymer having an acid number of 8–12.

To these constituents is added approximately 56 weight % of quartz powder for a total of 100 weight %.

For use with normal plasters, the above additive, after dilution with quartz powder, is used in the proportion of 100 grams for every 30 liters of washed natural sand and 7.5 liters of Portland cement. As already discussed, if the plaster is intended for use as an adhesive plaster, the amount of cement is increased so that 100 grams of the diluted additive are used for 20 liters of washed natural sand and 10 liters of Portland cement.

The plaster mortar is prepared in a per se known manner but should be mixed until the aggregate appears as a creamy foam which normally requires a mixture time of approximately 5 minutes.

The plaster additive according to the invention may be successfully used for thin adhesive plasters, thick ordinary plasters as well as thin finishing plasters but may also be used for any thick structural layers.

For use as an adhesive plaster, 90 grams of the pure additive or 200 grams of the additive mixed with 56 weight % of quartz powder are mixed with 40 liters of washed natural sand having graininess between 0 and 4 mm or 0 and 7 mm and 20 liters of Portland cement. The plaster so obtained is applied in a thin layer, for example a layer between 3 and 5 mm thick.

The secondary layer may be a normal plaster layer of approximately 12 mm thickness which is made from 60 liters of washed natural sand having graininess between 0 and 3 or 0 and 4 mm but including at least 80% of components between 0 and 1 mm. To the sand is added 15 liters of Portland cement and 90 grams of the pure additive according to the invention (calculated without quartz filler).

If a final finishing plaster is required, a finishing mortar is formed from 60 liter of washed natural sand of a graininess between 0 and 1 mm, 15 liters of Portland cement and 90 grams of the undiluted additive (without quartz filler).

Also for structural layer the mortar is formed from 60 liters of washed natural sand, however, having the desired graininess, and 15 liters of Portland cement and 90 grams of the additive (also calculated in undiluted form).

The foregoing description relates to merely preferred but entirely non-limiting examples of the invention whose scope and spirit extend to numerous variants thereof.

A plaster according to the invention having an average density of 1525 kg/m$^3$ when tested for its permeability to water vapor as measured by the dry region process according to the German Industrial Standard DIN 52615 in form of circular discs of 19 cm diameter and an average thickness of 20,5 mm exhibited a permeability to water vapor of approximately 1,3 (the diffusion admittance resistance $1/\Delta$ [m$^2$ . h . Torr/g]), which, compared to the permeability to water vapor of quiescent air, represents a coefficient of diffusion resistance of $\mu = 6,5$ which in turn corresponds to an equivalent air thickness layer $\mu s$ of 0,13 [m].

This exceptionally good value for an average raw density of the plaster of approximately 1.5 grams/cm$^3$ shows that the permeability to water vapor is substantially better than is the case in any of the heretofore known plasters.

What is claimed is:

1. An additive for use with dehumidifying cement-based plasters containing surface active agents including:
   (a) 15-50 weight % of anionic sodium salts of alkyl-napthalene sulfonic acids;
   (b) 25-75 weight % of sodium salts of alkylphenol ether sulfate and/or alkylbenzene sulfonate; and
   (c) 10-40 weight % of a butadiene free styrene interpolymer having an acid number of 5-15 as suitable for producing aqueous dispersions of plaster.

2. A plaster additive according to claim 1, wherein said components (a), (b), (c) are admixed as fine-grained dry powders.

3. A plaster additive according to claim 1, wherein said component (b) consists of sodium salts of sulfated $C_{12}$-$C_{15}$-oxoalcohol ether.

4. A plaster additive according to claim 1, wherein said component (c) is a styrene/acrylic acid copolymer.

5. A plaster additive according to claim 1, wherein said component (c) is a styrene/acrylic acid ester/acrylic acid interpolymer having an acid number of 8-12.

6. A plaster additive according to claim 1, wherein the relative composition is: component (a) 30-40 weight %, component (b) 40-60 weight % and component (c) 10-20 weight %.

7. A plaster additive according to claim 1, further comprising an inert filler component.

8. A plaster additive according to claim 1, further comprising
   (d) 7-15 weight % of a size-free highly concentrated paraffin dispersion, and
   (e) 7-15 weight % of sodium salts of a naphthalene sulfonic acid formaldehyde condensation product.

9. A plaster additive according to claim 8, wherein the components (a), (b), (c) and (e) are provided as fine-grained dry powders.

10. A dehumidifying plaster comprising a mixture of
    (A) 100 kg of a mixture of sand and cement, and (B) an additive comprising:
    (a) 15-50 weight % of anionic sodium salts of alkyl-naphthalene sulfonic acids;
    (b) 25-75 weight % of sodium salts of sulfated $C_{12}$-$C_{15}$-oxoalcohol polyglycol ethers; and
    (c) 10-40 weight % of a styrene interpolymer having an acid number of 5-15 as suitable for producing aqueous synthetic dispersions.

11. A plaster composition according to claim 10, wherein said additive is present in an amount of 50-100 gm per 100 kg of said sand-cement mixture.

12. An adhesive plaster according to claim 10, wherein said additive is present in an amount of 50-125 gm per 100 kg of said sand and cement mixture.

13. A heat-insulating plaster consisting of 100 kg of a mixture of sand, cement, and a grainy heat flow resistant substance especially foamed polystyrene spheres combined with 50-100 grams of an additive comprising:
    (a) 15-50 weight % of anionic sodium salts of alkyl-naphthalene sulfonic acids;
    (b) 25-75 weight % of sodium salts of sulfated $C_{12}$-$C_{15}$-oxoalcohol polyglycol ethers; and
    (c) 10-40 weight % of a styrene interpolymer having an acid number 5-15 as suitable for producing aqueous synthetic dispersions.

14. In a plaster composition for application to a damp concrete or masonry wall, comprising plaster and a plaster additive, the improvement wherein said plaster additive comprises the additive of claim 1 present in an amount of 50-150 g per 100 kg of said plaster.

15. A method for providing a plastered wall surface to a damp masonry or concrete wall, which plastered wall surface is substantially dry but which continues to transmit an evaporate moisture from the interior of the masonry or concrete wall, the process comprising:
    removing old plaster and paint from said masonry or concrete wall and cleaning said wall;
    wetting said wall;
    applying an adhesive plaster layer of approximately 5 mm thick to said wall to a vertical height which lies above the visible moisture line by at least 1 and ½ wall thicknesses, said adhesive plaster comprising the composition of claim 11 wherein said additive is present in an amount of 50-125 g per 100 kg of said sand and cement mixture; and
    applying over said adhesive plaster a second plaster layer of 15-25 mm thickness, said second plaster comprising the composition of claim 11, wherein said additive is present in a lesser amount than said additive is present in the adhesive plaster layer per 100 kg of said sand-cement mixture.

* * * * *

UNITED STATES PATENT AND TRADEMARK OFFICE
CERTIFICATE OF CORRECTION

PATENT NO. :  4,225,358
DATED      :  September 30, 1980
INVENTOR(S):  Siegfried MAIER It is certified that error appears in the above-identified patent and that said Letters Patent are hereby corrected as shown below:

Cancel   [73] Assignee: Caterpillar Tractor Co., Peoria, Ill.

Signed and Sealed this

Third Day of February 1981

[SEAL]

Attest:

RENE D. TEGTMEYER

Attesting Officer       Acting Commissioner of Patents and Trademarks